United States Patent [19]

Kovac

[11] 4,000,791
[45] Jan. 4, 1977

[54] DISK BRAKE FOR REINFORCED DRIVE KEY MEMBER

[75] Inventor: James J. Kovac, Akron, Ohio

[73] Assignee: Goodyear Aerospace Corporation, Akron, Ohio

[22] Filed: Apr. 21, 1976

[21] Appl. No.: 678,837

[52] U.S. Cl. .............................................. 188/71.5
[51] Int. Cl. ....................................... F16D 55/36
[58] Field of Search ................. 188/18 A, 59, 71.4, 188/71.5; 192/70.11, 70.2

[56] References Cited
UNITED STATES PATENTS

| 2,132,029 | 10/1938 | Higbee | 188/71.5 X |
| 3,438,464 | 4/1969 | Barrington | 188/71.5 |
| 3,744,605 | 7/1973 | Piret | 188/71.5 X |

Primary Examiner—Duane A. Reger
Attorney, Agent, or Firm—J. G. Pere; P. E. Milliken

[57] ABSTRACT

A disk brake having a cylindrical drive member extending axially from one side flange of a wheel. The cylindrical drive member has axially extending keyslots which engage radially outwardly extending ears or keys on rotatable brake disks and cause the disks to rotate with the wheel. The keyslots are open at one end and have a reinforcement member bridging the open end of the keyslots to provide added hoop strength to the cylindrical drive member. The reinforcement member is preferably a circular metal band riveted to the periphery of the drive member adjacent the open end of the keyslots.

11 Claims, 5 Drawing Figures

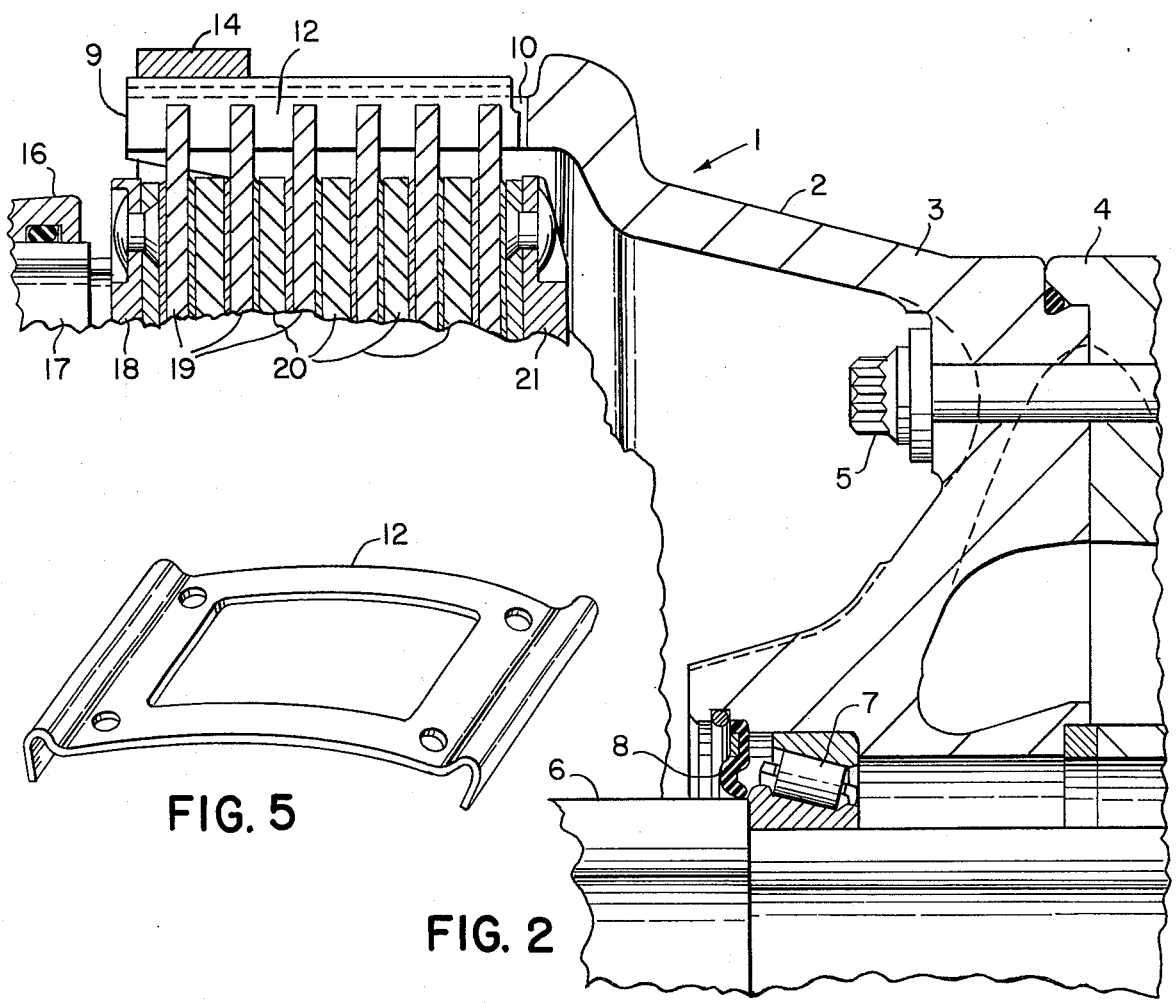
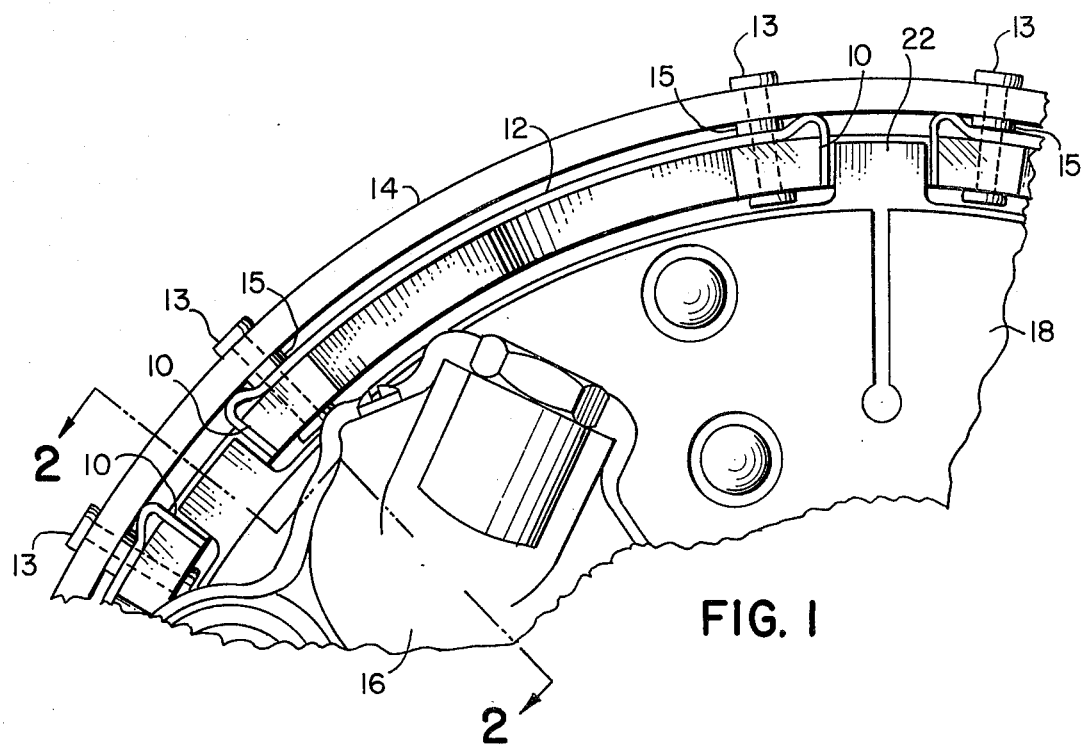
FIG. 5
FIG. 2
FIG. 1

DISK BRAKE FOR REINFORCED DRIVE KEY MEMBER

This invention relates to a disk brake having a cylindrical drive member with a plurality of axially extending keyslots which are open on one end. The invention more specifically relates to a reinforcing bridge member or circular band which extends across the open ends of the keyslots to provide added hoop strength to the drive member.

BACKGROUND OF THE INVENTION

In the past it has been well known in multiple disk brakes to provide an assembly in which a stack of brake disks are carried inside a wheel rim with the rotatable disks being keyed to keyslots provided around the inner surface of the wheel rim opposite the bead seat as shown in Nelson et al U.S. Pat. No. 3,650,357. In some instances, however, the diameter of the wheel does not provide sufficient room to place the brake disks inside the wheel rim. In such instance an alternative arrangement is to provide a cylindrical flange extending axially inwardly from the inner edge of the wheel rim and having keyslots in the circular flange to engage radially outwardly extending ears on the rotatable disks and cause the disks to rotate with the wheel. An example of a brake using such a cylindrical driving flange with open ended keyslots is shown in U.S. Pat. No. 3,438,464 to C. E. Barrington. In some instances it may be desirable to have a cylindrical driving flange extending axially from both sides of the wheel. Such an arrangement with the open ended keyslots is satisfactory when used with only a small number of brake disks. When the brake requires a large number of rotary disks to be keyed to a cylindrical member on the wheel and the keyslots are open ended, there is a tendency for the portions of the cylindrical member between the keyslots to bend radially outwardly when there is a large amount of heat build up in the wheel rim and cylindrical member and the brake is subjected to torque loads or rolling loads. This problem can occur in an airplane brake overheated from landing or a rejected take-off while taxiing back to the hanger.

OBJECTS OF THE INVENTION

It is a primary object of this invention to provide a reinforcing or bridging member to span the open ends of the keyslots in a cylindrical key drive member of a disk brake and prevent radially outward bending of the drive member due to high heat build up in a disk brake assembly combined with torque loads or rolling loads.

Another object of the invention is to impart increased hoop strength to a cylindrical drive member which engages the driving keys of rotatable brake disks in a disk brake assembly.

These and other objects of the invention will become more fully apparent as the description proceeds in the following specification and the attached drawings.

SUMMARY OF THE INVENTION

A brake disk comprising: a circular endless flange having a plurality of axially extending keyslots therein; said keyslots being open at one end thereof; a plurality of stationary disks; a plurality of rotatable disks interleaved between the stationary disks; each rotatable disk having a plurality of radially directed keys mating with the keyslots in the flange in such manner that the sides of the keyslots take torque exerted thereon by the rotatable brake disks upon brake application; means to move the disks axially into frictional engagement with each other; and bridge means spanning the open end of the keyslots to provide added hoop strength to the circular flange and prevent the flange from bending radially outwardly when it is subjected to high temperatures and torque loads during braking or rolling loads while the brake is hot.

BRIEF DESCRIPTION OF THE DRAWINGS

FIG. 1 is a fragmentary side elevational view of a wheel and brake assembly showing a disk brake utilizing the apparatus of the invention.

FIG. 2 is a fragmentary cross-sectional view taken on line 2—2 of FIG. 1;

FIG. 5 is a perspective view of a keyway reinforcing clip.

Figure 3:
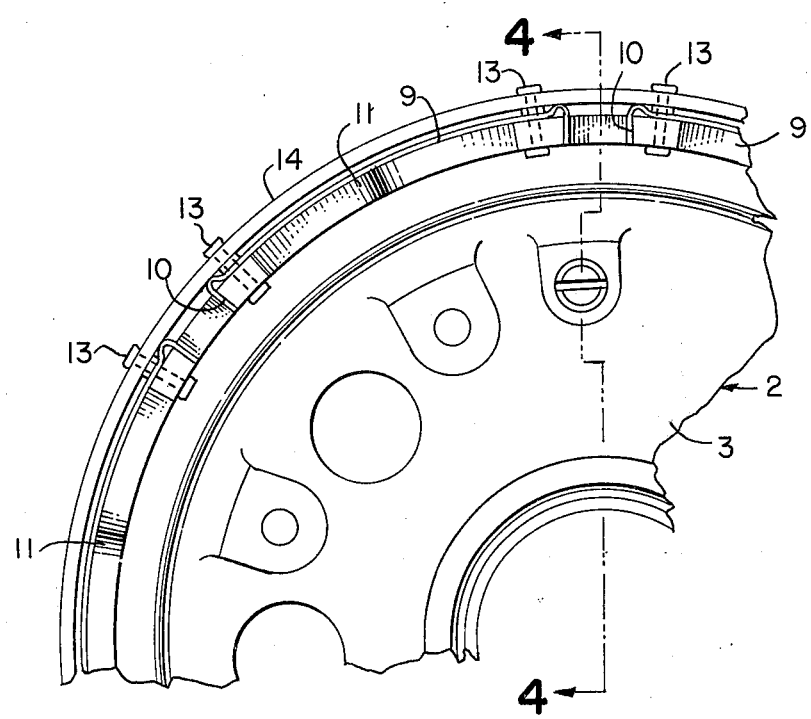
FIG. 3 is a fragmentary side elevational view of a wheel of the same type used in the assembly shown in FIGS. 1 and 2.

Referring to the drawings and more specifically to FIGS. 1 and 2, the numeral 1 indicates generally a complete wheel and brake assembly comprising a wheel 2 having wheel halves 3 and 4 joined together by bolts 5 and mounted on an axle 6 with conventional bearings 7 and having a bearing seal ring 8. The wheel rim half 3 is designated as the axially inner half of the wheel since it faces inwardly toward the strut of the airplane. The cylindrical drive member 9 extends axially inwardly from the axial inner edge of the wheel half 2. The drive member 9 is simply a cylindrical flange which is an integral extension of the tire bead retaining side flange of the wheel half 2. The drive member 9 has a plurality of axially extending keyslots 10 spaced apart around the circumference thereof. Between each of the keyslots 10 a substantially V-shaped opening 11 is cut through the cylindrical drive member 9 at the axially inner edge for the purpose of lightening the assembly. This is particularly desirable in aircraft wheels where lower weight is a desirable factor. The openings 11 in the drive member 9 also permit better air circulation for cooling the brake.

A stamped metal keyslot reinforcing clip 12 shown in detail in FIG. 5 extends between each adjacent pair of keyslots and has a portion thereof bent in such manner as to engage the lateral edge of one side of each of two adjacent keyslots 10. The keyslot reinforcing clips 12 are held in position by a plurality of rivets 13 extending through the drive member 9 and through a circumferential reinforcing band member 14 which encircles the outer periphery of the cylindrical drive member 9 adjacent the edge with the open keyslot ends. If needed, spacers 15 may be used between the keyslot clips 12 and the reinforcing band 14 with the rivets 13 passing through the spacers 15 to hold them in position. With some configurations of keyslots reinforcing clips the spacers 15 may be used between the clips 12 and the cylindrical drive member 9. The functioning of the keyslot reinforcing clips is described in greater detail in U.S. Pat. No. 3,438,464 issued to C. E. Barrington.

As shown in FIGS. 1 and 2 the assembly includes a brake cylinder 16 having a slidable piston 17 therein which moves a pressure plate 18 to move a stack of brake disks including rotatable disks 19 and non-rotatable disks 20 in an axial direction against a back up plate 21. The operation of the stack of brake disks and the actuating piston is conventional and will not be described in further detail. The rotatable disks 19 have a plurality of radially outwardly extending drive keys or ears 22 which engage the keyslots 10 through the keyslot clips 12.

When a multiple disk brake is applied there is often a large amount of heat build up in the wheel particularly in the area of the brake disk stacks. Such high heat build up tends to weaken the heated portions of the wheel and in the assembly shown the torque forces or roll-out forces of the rotatable disks 19 cause the cylindrical drive member 9 to bend radially outwardly particularly due to the open ended keyslots thereby increasing the diameter of the drive member 9 to the point where at least some of the rotatable disks 19 will no longer engage the keyslots 10 and the brake will become inoperative. The bending often occurs in the area where the cylindrical drive member merges with the tire retaining side flange at the axially inner edge of the wheel, however, it can occur all along the axial length of the member 9.

Figure 4:
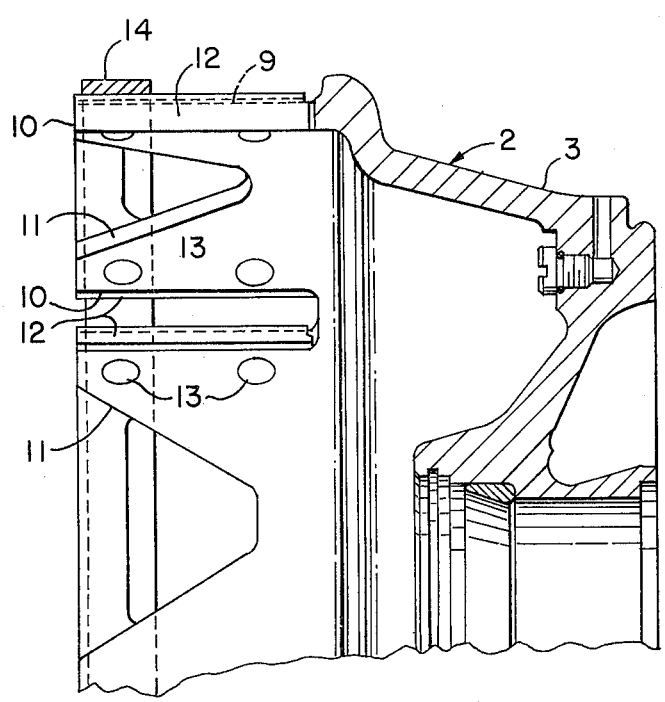
FIG. 4 is a fragmentary cross-sectional view taken on line 4—4 of FIG. 3.

Referring now to FIGS. 3 and 4, by looking at the wheel separately apart from the brake assembly including the disks, the configuration of the cylindrical drive member 9 including the keyslots 10 and the cutaway portions 11 can be more clearly visualized and the need for the reinforcing band member 14 can be more readily understood. While the band member 14 is shown as a continuous circumferential band it is also possible on some brakes to use discontinuous members bridging the gap across the open ends of the keyslots 10. The band 14 may be used with or without the keyway clips 12. While the band 14 is shown fastened in place by rivets 13, other suitable fastening means such as bolts, welding or other means may also be used to fasten the band to the drive member. It should also be understood that the reinforcing member may in some instances be made as an integral part of the drive member so long as the ends of the keyslots are open to permit insertion and removal of the rotatable brake disks with the radially outwardly extending ears.

While the brake and cylindrical drive member has been shown herein as used in combination with a wheel it can also be used with any rotary member to be braked. The cylindrical drive member can extend from both axial edges of the wheel rather than from one axial edge.

Various other modifications may be made therein without departing from the scope of the invention.

What is claimed is:
1. A disk brake comprising:
A. A circular flange having a plurality of axially extending keyslots therein;
B. said keyslots being open at one end thereof;
C. a plurality of stationary disks;
D. a plurality of rotatable disks interleaved between the stationary disks;
E. each rotatable disk having a plurality of radially directed keys mating with the keyslots in the flange in such manner that the sides of the keyslots take torque exerted thereon by the rotatable brake disks upon brake application;
F. means to move the disks axially into frictional engagement with each other; and
G. bridge means spanning the open end of the keyslots to provide added hoop strength to the circular flange and prevent the flange from bending radially outwardly when it is subjected to high temperatures and torque loads during braking or rolling loads while the brake is hot.

2. A disk rake as claimed in claim 1 wherein the bridge means is a circular band passing around the outer periphery of the circular flange at the open end of the keyslots.

3. A disk brake as claimed in claim 2 including means to fasten the circular band to the circular flange.

4. A disk brake as claimed in claim 3 wherein the circular band is steel and the fastening means is a plurality of rivets passing through the band and the flange.

5. A disk brake as claimed in claim 1 wherein the circular flange extends axially outwardly from one axially outer edge of a wheel rim and is integral with said rim.

6. A disk brake as claimed in claim 1 including keyslot reinforcement means engaging the lateral sides of the keyslots in flat face to face relation to receive and transmit all torque therethrough and means fastening the reinforcement means to the circular flange.

7. A disk brake as claimed in claim 6 wherein the means fastening the keyslot reinforcing means also fastens the bridge means in position on the circular flange.

8. A disk brake comprising:
A. A rotatable wheel;
B. a stack of axially moveable brake disks having rotatable and non-rotatable disks interleaved between each other;
C. a plurality of finger-like members extending axially from one lateral edge of the wheel and forming a substantially cylindrical driver said members being spaced apart in the circumferential direction to define therebetween axially extending keyslots;
D. each of the rotatable disks having a plurality of radially outwardly extending keys engaging the keyslots;
E. driver reinforcing means bridging the tips of at least part of the finger-like members to provide added hoop strength and prevent the finger-like members from bending radially outwardly when the assembly is subjected to high braking temperatures and torque forces; and
F. means moving the disks axially into frictional engagement with each other.

9. A disk brake as claimed in claim 8 wherein the driver reinforcing means is a circular band passing around the radially outer surface of the finger-like members at the tips thereof.

10. A disk brake as claimed in claim 8 including means to fasten the driver reinforcing means to the finger-like members.

11. A disk brake as claimed in claim 8 including keyway reinforcing means covering the lateral edges of the keyways and means fastening both the keyway reinforcing means and the driver reinforcing means to the finger-like members.

* * * * *